United States Patent [19]
Yokose et al.

[11] Patent Number: 5,369,674
[45] Date of Patent: Nov. 29, 1994

[54] PLANT DIAGNOSIS APPARATUS AND METHOD

[75] Inventors: Kenji Yokose; Makoto Nagase; Hiroshi Kamimura, all of Hitachi; Yamato Asakura, Katsuta; Tetsuya Matsui, Hitachi; Hidefumi Ibe, Katsuta; Yoshitaka Nishino; Shunsuke Uchida, both of Hitachi, all of Japan

[73] Assignee: Hitachi, Ltd., Tokyo, Japan

[21] Appl. No.: 824,399

[22] Filed: Jan. 23, 1992

[30] Foreign Application Priority Data

Jan. 23, 1991 [JP] Japan .................. 3-006208

[51] Int. Cl.$^5$ ............................................ G21C 17/00
[52] U.S. Cl. ...................................... 376/245; 376/256
[58] Field of Search ................. 376/245, 256, 310; 210/743, 746; 204/153.22; 422/71, 80, 82.02

[56] References Cited

U.S. PATENT DOCUMENTS

| | | | |
|---|---|---|---|
| H289 | 6/1987 | Beltracchi | 364/492 |
| 3,849,655 | 11/1974 | Martucci | 250/366 |
| 4,060,716 | 11/1977 | Pekrui et al. | 364/576 |
| 4,421,716 | 12/1983 | Hench et al. | 376/216 |
| 4,570,489 | 2/1986 | Baumaire et al. | 73/658 |
| 4,696,191 | 9/1987 | Claytor et al. | 73/600 |
| 4,759,902 | 7/1988 | Anstine | 376/245 |
| 4,833,622 | 5/1989 | Barto et al. | 364/496 |
| 4,913,625 | 4/1990 | Gerlowski | 417/18 |
| 4,937,038 | 6/1990 | Sakai et al. | 376/245 |
| 5,073,499 | 12/1991 | Bellows | 436/50 |
| 5,132,075 | 7/1992 | Asakura et al. | 376/310 |

FOREIGN PATENT DOCUMENTS

| | | |
|---|---|---|
| 3734487A1 | 10/1987 | Germany . |
| 0328408 | 8/1989 | Germany . |
| 0417571 | 3/1991 | Germany . |
| 2238650 | 10/1990 | United Kingdom . |

OTHER PUBLICATIONS

IEEE Transactions on Nuclear Science, vol. 36, No. 1, Feb. 1989: *Development of BWR Plant Data Analysis and Diagnosis Information System*, N. Fukawa et al.

Primary Examiner—Donald P. Walsh
Assistant Examiner—Meena Chelliah
Attorney, Agent, or Firm—Antonelli, Terry, Stout & Kraus

[57] ABSTRACT

This invention concerns a plant diagnosis apparatus which comprises a first detecting unit for detecting a state of devices constituting a circulating system in which a fluid circulates and a second detecting unit for detecting a quality of the above-mentioned circulating fluid or a quality of the atmosphere surrounding the above-mentioned circulating system, and a unit for diagnosing the circulating system by output of the first and second detecting units, and therefore can diagnose anomaly of facilities such as a nuclear power plant with high reliability and rapidity.

44 Claims, 10 Drawing Sheets

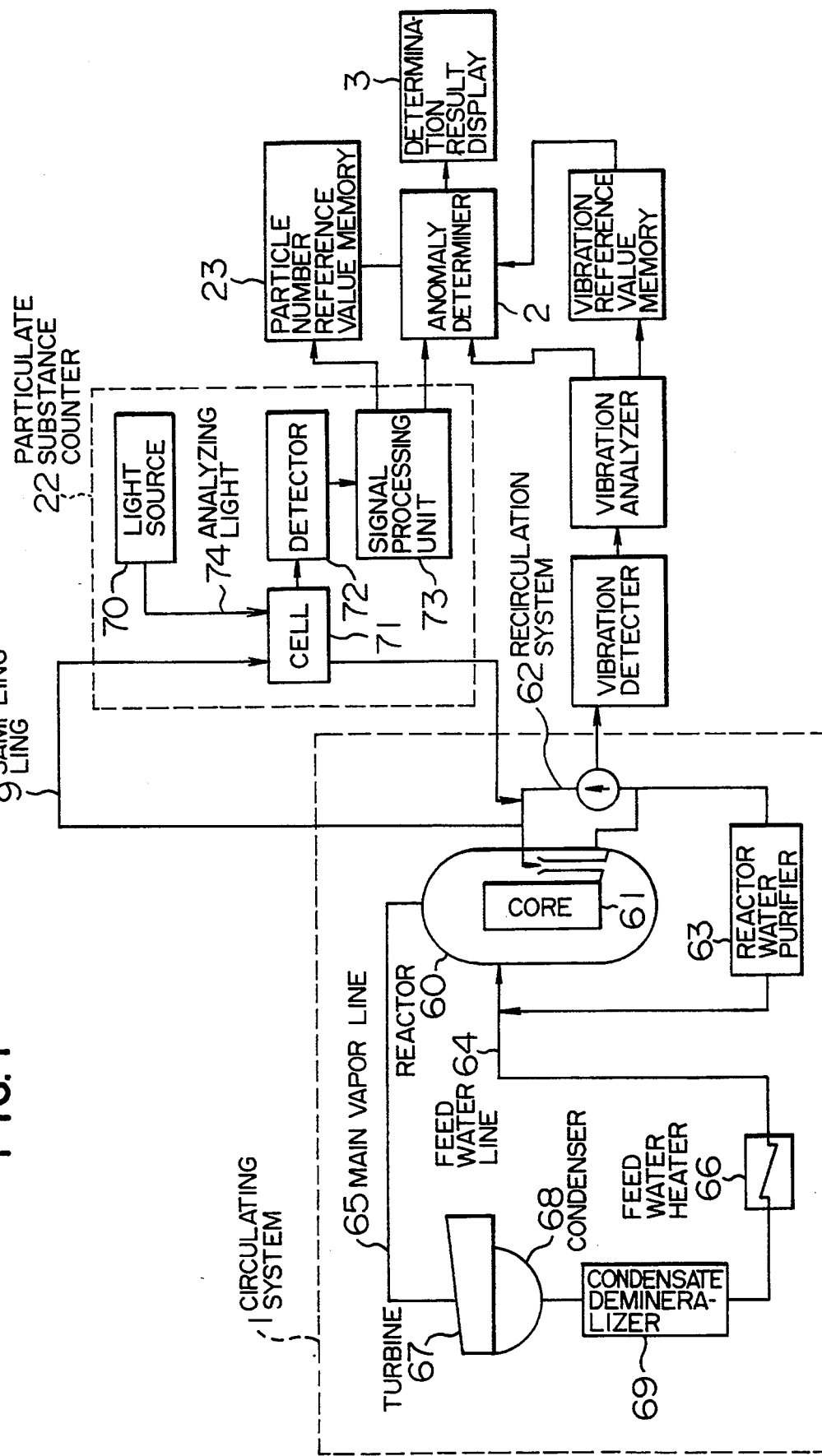
FIG. I

PLANT DIAGNOSIS APPARATUS AND METHOD

BACKGROUND OF THE INVENTION

This invention relates to anomaly diagnosis of the equipment, and more particularly to improvement of reliability of diagnosis of a plant having a circulating system in which a fluid circulates.

Heretofore, technologies for anomaly diagnosis of equipment including a circulating system have been revealed in JP-A-64-46694, JP-A-62-223905, and JP-A-59-60293. JP-A-64-46694 concerns a method in which a quantity under observation is measured, and from its output level, anomaly is diagnosed. In a region where a radioactive level is high such as a nuclear reactor primary system, this method depends very much on the soundness of the measuring instrument.

JP-A-62-223905 discloses a method in which large threshold values are set for output of process quantities in steady state, and when a process quantity exceeds its large threshold value, threshold values of other process quantities are lowered, and diagnosis is conducted.

JP-A-59-60293 relates to a circulating system and describes a method for diagnosing anomaly from correlation between two quantities under observation (conductivity and pH) concerned with water quality.

In the above-mentioned prior art, when anomaly occurs, decision cannot be made whether the anomaly is a true anomaly or an anomaly originating in the detector caused by noise or the like. Especially when the detector can detect anomaly only by a transient signal, it is impossible to confirm whether the anomaly is a true anomaly. Therefore, the problem with the prior art is that anomaly cannot be diagnosed with high reliability.

The method in JP-A-59-60293 can detect ions when they are produced by anomaly of the equipment, but cannot detect particulate substances such as cladding.

SUMMARY OF THE INVENTION

A first object of the present invention is to provide a plant diagnosis apparatus featuring high reliability for use in a plant including a circulating system.

A second object of the present invention is to provide a plant diagnosis apparatus capable of detecting anomaly when particulate substances such as clad are produced.

According to a first technique for achieving the first object mentioned above, there are provided with a first detection unit for detecting the state of the devices constituting a circulating system in which a fluid circulates and a second detection unit for detecting a quality of the circulating fluid, wherein diagnosis of the circulating system is performed according to output of the above-mentioned first and second detection units.

According to a second technique for achieving the first object, there are provided with a first detection unit for detecting the state of the devices constituting a circulating system in which a fluid circulates and a second detection unit for detecting the quality of the atmosphere around the circulating system, wherein diagnosis of the circulating system is performed according to outputs of the second and first detection units.

According to a third technique for achieving the first object, there are provided with a first detection unit for detecting a first state of a circulating system in which a fluid circulates and a second detection unit for detecting a second state of the circulating system, wherein diagnosis of the circulating system is performed by verifying the presence or absence of anomaly of the devices determined according to an output of the first detection unit by the second detection unit.

According to a technique for achieving the second object, there is provided with an analyzing unit for analyzing particulate substances in the fluid flowing in the circulating system, wherein diagnosis of the circulating system is performed according to results from the analyzing unit.

The diagnostic principle of the first and second techniques for achieving the first object will be described. When anomaly occurs in some of the devices constituting the circulating system, a change occurs in the fluid itself flowing in the circulating system or a change occurs in the atmospheric environment around the circulating system. Therefore, when anomaly occurs in the devices, the quality of the fluid or the atmosphere around the circulating system is detected, so that a decision can be made reliably whether anomaly has actually occurred.

The above-mentioned diagnostic principle will be described with reference to an example in which abnormal vibration occurs in the circulating system. A possible cause of the abnormal vibration is anomaly in rotary devices such as pumps or loosening of the fixed members such as pipes or the like. When the abnormal vibration occurs in some device, particulate substances such as clad initially adhering to the internal walls of the devices or to the structural members near the devices comes off and falls caused by the vibration, or the device material is scrubbed off by friction, for example. As a result, in the former case, the number of particles of the particulate substances increases in the circulating water in the device. In the latter case, the scrubbed-off metal become ions and flow in the fluid, so that the conductivity or the hydrogen-ion concentration (pH) changes. The basic patterns of change are shown in FIGS. 2 and 3. FIG. 2 shows a case in which the vibration indicating the state of the devices, constituting the circulating system, changed with a conspicuous change in level and the number of particles of the particulate substances in the circulating fluid, which indicates the quality of the circulating fluid, changed substantially at the same time with a notable change in level. FIG. 3 presents a case in which the vibration occurred a sudden pulse-like, transient phenomenon, and subsequently, particles are detected in the circulating fluid. Whether those changes occur simultaneously or one after another has nothing to do with whether the changes are levelwise or pulse-like. Therefore, for example, it can happen that a level-wise change occurs in the amplitude and particulate substances are detected later. When particulate substances are detected, if the sampling section for analysis of particulate substances is close to the vibration detector, this detection occurs almost simultaneously. If these two sections are separate from each other, the particulate substances are detected with some delay which depends on the flow velocity. In any case, if monitoring is made only for vibration, decision cannot be made whether or not the signal is generated by a fault of the vibration detector. By detection of something which indicates the quality of the circulating fluid, the presence or absence of anomaly can be determined unfailingly; because this change in the fluid quality occurs in conjunction with the above-mentioned anomaly. Especially in the case of a temporary change as shown in FIG. 3, it is difficult to decide whether this phenomenon is noise detected by the detector which operates normally or anomaly has actually occurred. By use of this invention, true anomaly can be detected reliably.

When abnormal vibration occurs in the devices, if the result is sent through the gaseous portion of the circulating liquid or a gas produced by processing the liquid is discharged to the outside, an abnormal change of the devices manifests as a change in the atmospheric environment around the circulating system. Like by detecting the quality of the liquid, by monitoring the atmospheric environment of the circulating system, the presence or absence of anomaly can be detected surely. In the description of anomaly, vibration was used as means for detecting anomaly of the devices, but other available means for this detection are, for example, the temperature, sound, or the like of the devices, or the flow rate of the fluid.

Description will now be made of a method for surely determining anomaly of concern by detecting the two states of the circulating system as the third technique for achieving the first object of the present invention. Let us consider, for example, a case in which a heat exchanger or a heater is included in the devices constituting the circulation equipment. When anomaly occurs in the heat exchanger or the heater, the temperature of the fluid changes. As the temperature of the liquid changes, the quality of water such as ion concentration, which is temperature-dependent, changes, so that by monitoring the water quality, the change of temperature can be confirmed with high accuracy.

Finally, description will be made of the technique for achieving the second object of the present invention. As has been described with reference to the first technique for achieving the first object, depending on the kind of anomaly, the clad may sometimes be mixed in the liquid, which cannot be measured in terms of conductivity or ion concentration. In such a case, it is effective to analyze a particulate substance such as clad. For analysis of particulate substances, one method is to monitor the number of particles, concentration, particle size, or the like.

BRIEF DESCRIPTION OF THE DRAWINGS

FIG. 1 is an equipment arrangement diagram of a basic embodiment of the present invention;

DESCRIPTION OF THE PREFERRED EMBODIMENTS

Figure 2A:
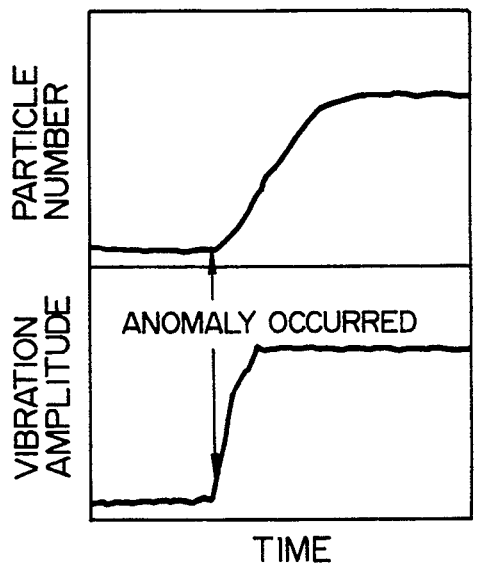
FIGS. 2A and 2B are correlation diagrams between the vibration of the devices and the particle number in the circulating system.
Figure 2B:
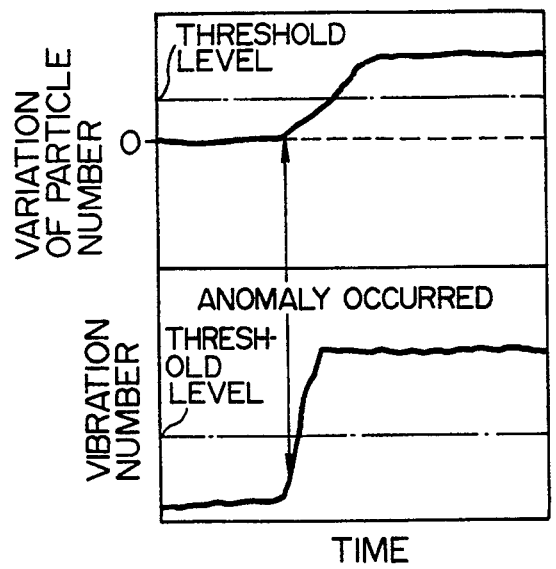
Figure 3:
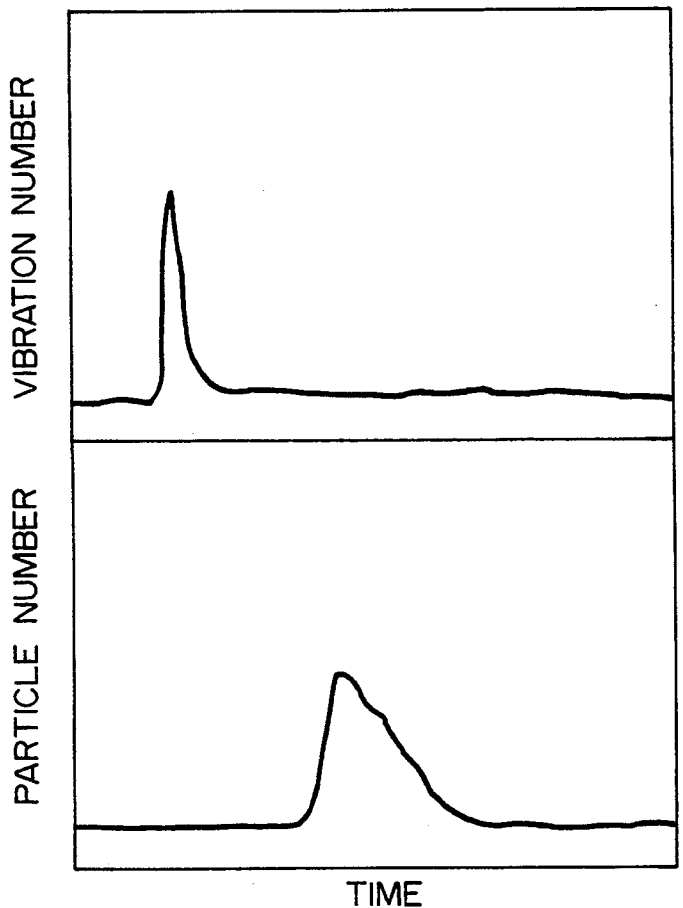
FIG. 3 is a correlation diagram when there is a delay from the vibration of the devices to the particle number of the circulating system.

Embodiments of the present invention will be described with reference to FIG. 1 and FIGS. 4 to 18.

An embodiment of the present invention is shown in FIG. 1. Let us consider a nuclear power plant as an example of a circulating system 1 to which this invention is applied. In a circulation line of the circulating system 1, pure water is boiled in a core 61 of the nuclear reactor 60, the vapor is sent through a main vapor line 65 to drive a turbine 67, and then liquefied by a condenser 68. The condensate is passed through a condensate demineralizer 69 and converted into pure water, and after pre-heated by a feed water heater 66, the pure water returns to the nuclear reactor 60 through a feed water line 64. While the pure water is fed back to the nuclear reactor 60 by a recirculation system 62, the water purified by a reactor water purifier 63 is led to the feed water line 64. A vibration detector 10 mounted on the circulating system 1 detects vibration of the devices. To be more specific, in this embodiment, the vibration detector 10 detects the vibration of the recirculation system 62. The detected vibration is analyzed by a vibration analyzer 11 in terms of vibration level, frequency pattern, etc. Output of the vibration analyzer 11 is stored in a vibration reference value memory 12, and also input into an anomaly determiner. Due to the abnormal vibration of the devices, the particulate substances such as clad initially adhering to the internal walls of the devices or to the structural material near the devices come off and fall, and as a result, the number of particulate substances increases in the circulating water in the devices. The circulating liquid is led from the circulating system through a sampling line 9 to a particulate substance counter 22. In the particulate substance counter 22, the circulating liquid is led to a cell 71. An analyzing light 74 is emitted to the cell 71 by a light source 70. Therefore, when a particulate substance passes through the cell 71, the analyzing light 74 is scattered by the particulate substance, so that a scattered light is produced. The scattered light is detected by a detector 72, and a detection signal is sent to a signal processing unit 73. Detection signals are counted by the signal processing unit 73, and by this counting, the number of particulate substances that have passed the cell 71 can be counted. The output of the signal processing unit 73, or the counting result is used as output of the particulate substance counter 22. The particulate substance counter 22 sends the count of particulate substances in the liquid to the particle number reference value memory 23 to be stored therein and also to the anomaly determiner 2. The anomaly determiner 2 is constantly detecting any change from the measured levels in steady state by comparing input measured values with reference values, and determines anomaly when two variations exceed threshold levels. If one variation is very large, the other variation may be multiplied by a coefficient of weight to thereby lower the threshold level relative to the thus increased variation, under which condition a decision is made whether anomaly has occurred. Output of the anomaly determiner 2 is supplied to a determination result display 3. In this embodiment, the sampling line 9 was provided in the recirculation system 62. However, the circulating system 1 may be regarded as comprising the core 61, the main vapor line 65, the turbine 67, condenser 68, condensate demineralizer 69, the feed water heater 66, and the feed water line 64, and the sampling line 9 may be provided between the condenser 68 and the condensate demineralizer 69, for example. In this case, there is a considerable distance between the recirculation system 62 to be constantly checked for vibration and the condenser 68 to which the sampling line 9 is connected, so that there is bound to be a delay from when the vibration detector 10 detects vibration until the particulate substance counter 22 detects a change in the number of particles. This is because this length of time is required for the circulating water to move through the core 61, the main vapor line 65 and the turbine 67. Therefore, in this case, the delay is taken into account and the time base is shifted by the amount corresponding to the delay, and decision is maze whether anomaly has occurred. The circulating system 1 may be regarded as comprising the core 61, the reactor water purifier 63 and the feed water line 64 and the sampling line 9 may be laid to be connected with the reactor water purifier 63. In this embodiment, a particle counter utilizing a light scattering phenomenon is adopted as the particulate substance counter 22, but it is also possible to use filters with different pore sizes to collect particulate substances in separate groups of different particle sizes and measure their radioactivity. Or, a breakdown-system particle counter may be adopted. According to this embodiment, a measuring method is adopted on particulate substances that fall off as the vibration level of the devices increases, so that measurement can be done in-line to quickly diagnose anomaly of the equipment with rapidity and high reliability.

Figure 4:
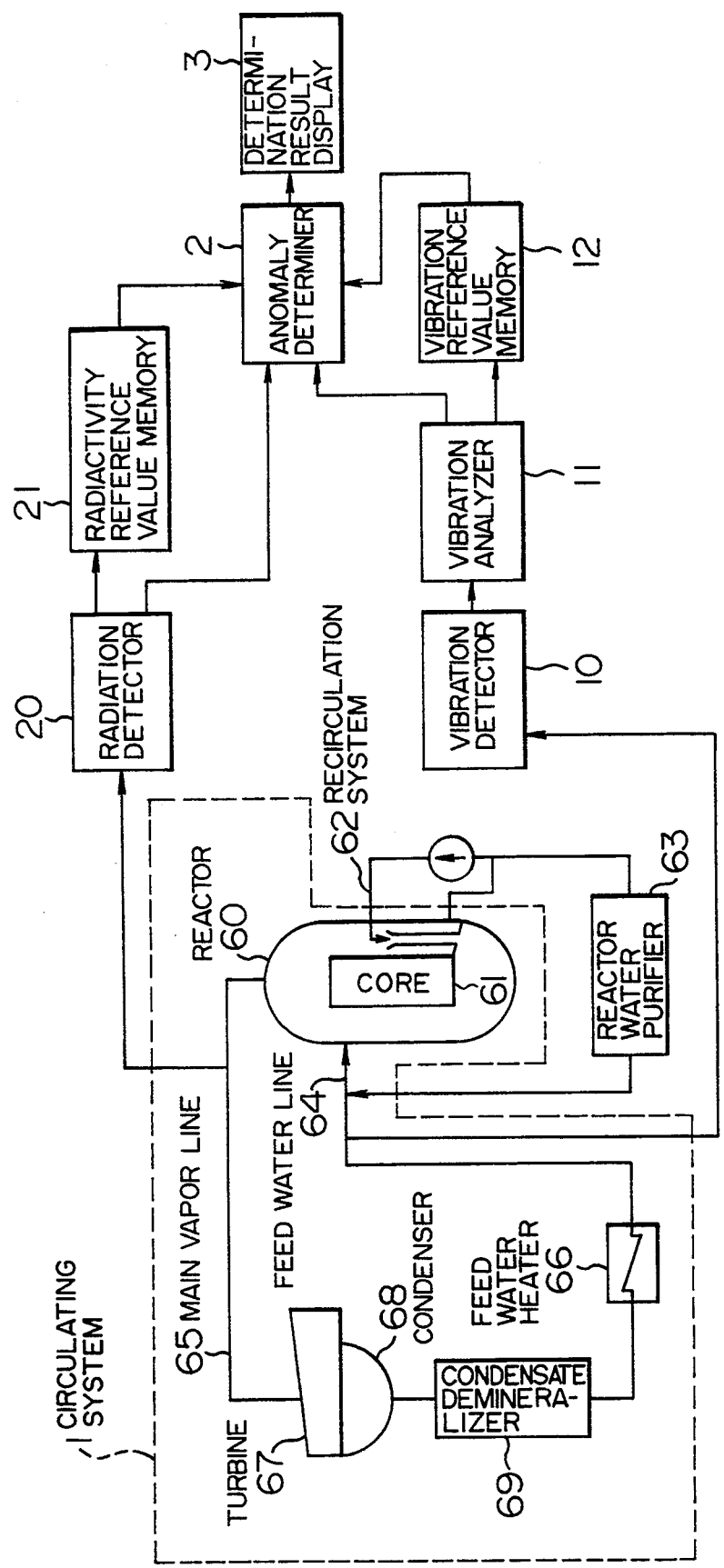
FIG. 4 is a device arrangement diagram of an embodiment of anomaly diagnosis combining a radiation measuring method and vibration detection.

Another embodiment is shown in FIG. 4. In this embodiment, the circulating system 1 is regarded as comprising the core 61, the main vapor line 65, the turbine 67, the condenser 68, the condensate demineralizer 69, the feed water heater 66, and the feed water line 64, and the vibration detector 10 is attached to the feed water line 64, and detected vibration is analyzed by the vibration analyzer 11 in terms of vibration level, frequency pattern, etc. Output of the vibration analyzer 11 is stored in the vibration reference value memory 12, and also input to the anomaly determiner 2. When abnormal vibration occurs in the devices of a nuclear power plant, a crack has happened in the devices, so that chromate ions or the like dissolve out from the crack, changing the quality of the circulating water to the acid side. On the other hand, the circulating water normally contains nitrogen molecules ($N_2$) in solution, but when the water quality is acidified, the solubility of $N_2$ decreases, and the supersaturated portion of $N_2$ goes to the gaseous phase. The circulating water of the nuclear reactor contains some of radioactive $^{16}N$, so that $N_2$ which goes to the gaseous phase contains $^{16}N$. Radiation can be detected on the $^{16}N$ in the gaseous phase. So, the dosage included in the medium of the circulating system is detected with a radiation detector 20. The radioactivity level detected by the radiation detector 20 is stored in the radioactivity reference value memory 21, and also input into the anomaly determiner 2. The anomaly determiner 2 is constantly detecting any change from the measured levels in steady state by comparing input measured values with reference values, and determines anomaly when two variations exceed threshold levels. At this time, if one variation is very large, the other variation may be multiplied by a coefficient of weight to thereby lower the threshold level relative to the increased variation, under which condition a decision is made whether anomaly has occurred. Output of the anomaly determiner 2 is supplied to the determination result display 3. In order to detect a phenomenon that the quality of the circulating water changes in consequence of abnormal vibration of the devices, the conductivity or the hydrogen ion concentration (pH) may be measured. According to this embodiment, an increase in radioactivity level of radioactive elements is detected which attends on an increase in vibration level of the devices, so that anomaly of the equipment can be diagnosed with high reliability.

Figure 5:
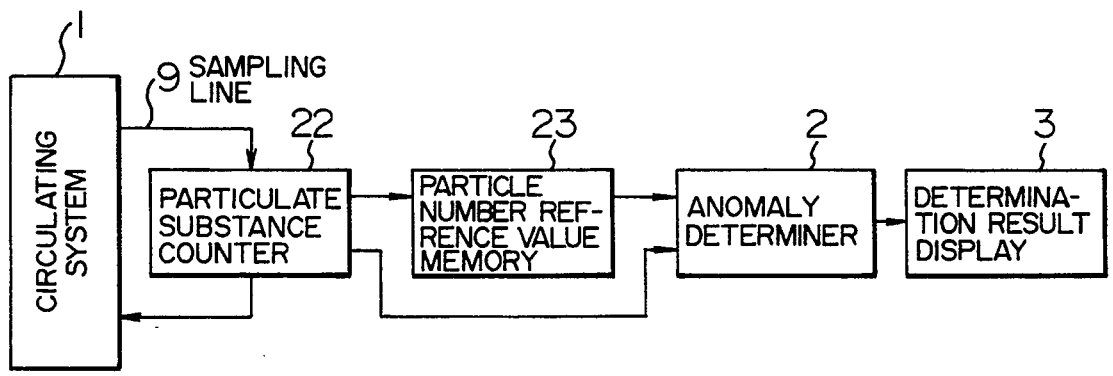
FIG. 5 is a device arrangement diagram of an embodiment of anomaly diagnosis by a particle number counting method.

Another embodiment is shown in FIG. 5. In this embodiment, for diagnosis of anomaly of the circulating system, an arrangement is made so as to adopt a particulate substance counting method. The circulating liquid is led from the circulation equipment 1 through the sampling line 9 to the particulate substance counter 22. The particulate substance counter 22 counts particulate substances in the liquid, and the counting result is stored in the particle number reference value memory 23, and also input into the anomaly determiner 2. The anomaly determiner 2 is constantly detecting any change from the measured levels in steady state by comparing an input measured value with a reference value, and outputs anomaly when a variation exceeds a threshold level. Output of the anomaly determiner 2 is supplied to the determination result display 3. In this embodiment, one particulate substance counter 22 is used, but it is possible to set a plurality of sampling points by combining sampling lines 9 and particulate substance counters 22, and subdivide the circulating system 1 to assume a position in the circulating system 1 where anomaly has occurred. In this embodiment, a measuring method on particulate substances that come off and fall due to anomaly of the equipment, so that the measurement can be done in-line and anomaly of the circulating system 1 can be diagnosed quickly.

Figure 6:
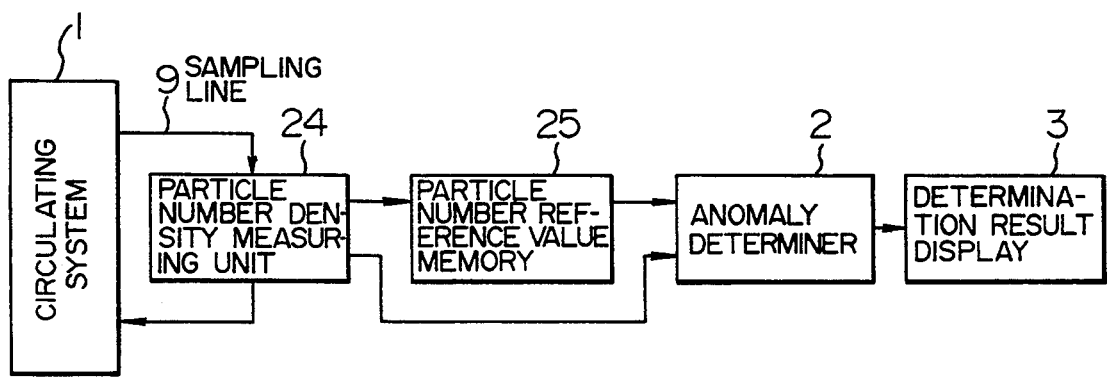
FIG. 6 is a device arrangement diagram of an embodiment of anomaly diagnosis by a particle number density measuring method.

Yet another embodiment is shown in FIG. 6. In this embodiment, an arrangement is made to adopt a particle number density measuring method of particulate substances for anomaly diagnosis of the circulating system 1. The circulating liquid is led from the circulating system through the sampling line 9 to the particle number density measuring unit measures a number density of particulate substances in the liquid, and the result is stored in the particle number density reference value memory 25 and also input into the anomaly determiner 2. The anomaly determiner 2 is constantly detecting any change from the measured levels in steady state by comparing an input measured value with a reference value, and outputs anomaly when a variation exceeds a threshold level. Output of the anomaly determiner 2 is supplied to the determination result display 3. In this embodiment, a method of measuring particulate substances that come off and fall due to anomaly of the equipment, and therefore, measurement can be made in-line to diagnose anomaly in the circulating system 1.

Figure 7:
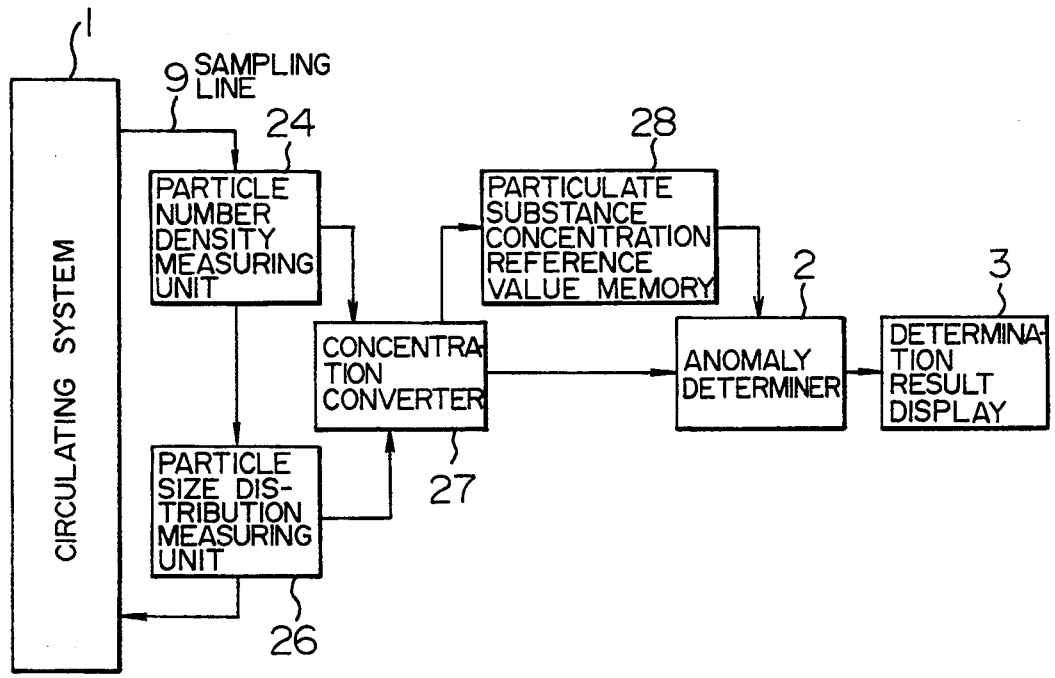
FIG. 7 is a device arrangement diagram of an embodiment of anomaly diagnosis by a particle concentration measuring method.

FIG. 7 shows a still another embodiment. In this embodiment, an arrangement is made to adopt a particulate substance density measuring method for anomaly diagnosis of the circulating system 1. The liquid that circulates through the sampling line 9 from the circulating system 1 is led to the particle number density measuring unit 24 and the particle size distribution measuring unit 26. The particle number density measuring unit 24 measures a number density of particulate substances in the liquid, and at the same time, the particle size distribution measuring unit 26 measures a particle size distribution of particulate substances. The measurement results of the particle number density measuring unit 24 and the particle size distribution measuring unit 26 are input to a concentration conversion unit 27 where a concentration of the particulate substances is calculated. The calculation result is stored in a particulate substance concentration reference value memory 28 and also supplied to the anomaly determiner 2. The anomaly determiner 2 is constantly detecting any change from the measured levels in steady state by comparing an input measured value and a reference value, and outputs anomaly when a variation exceeds a threshold level. Output of the anomaly determiner 2 is supplied to the determination result display 3. In this embodiment, a method is adopted to measure particulate substances that come off and fall due to anomaly of the equipment, so that measurement is made in-line to quickly diagnose anomaly of the circulating system 1.

Figure 8:
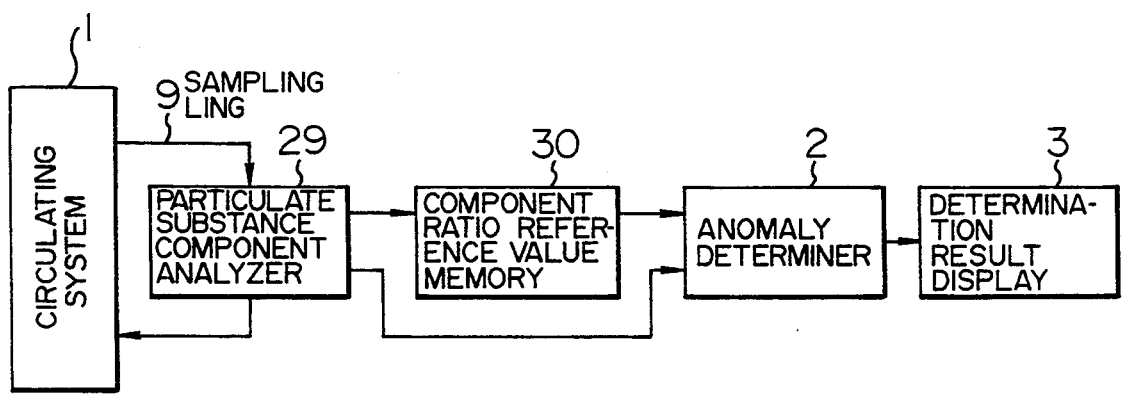
FIG. 8 is a device arrangement diagram of an embodiment of anomaly diagnosis by a particle component analysis method.

Another embodiment is shown in FIG. 8. In this embodiment, an arrangement is made to adopt a particulate substance component analysis method for anomaly diagnosis of the circulating system 1. The circulating liquid is led from the circulating system 1 through the sampling line 9 to a particulate substance component analysis unit 29. The particulate substance component analysis unit 29 measures components of the particulate substance in the liquid, and the measurement results are stored in a component ratio reference value memory 30, and also input to the anomaly determiner 2. The anomaly determiner 2 is constantly detecting any change from the measured levels in steady state by comparing an input measured value with a reference value, and outputs anomaly when a variation exceeds a threshold level. Output of the anomaly determiner 2 is supplied to the determination result display 3. In this embodiment, a method of analyzing the components of the particulate substances that come off and fall due to anomaly of the equipment, which makes it possible to perform measurement in-line to quickly diagnose anomaly of the circulating system 1.

Figure 9:
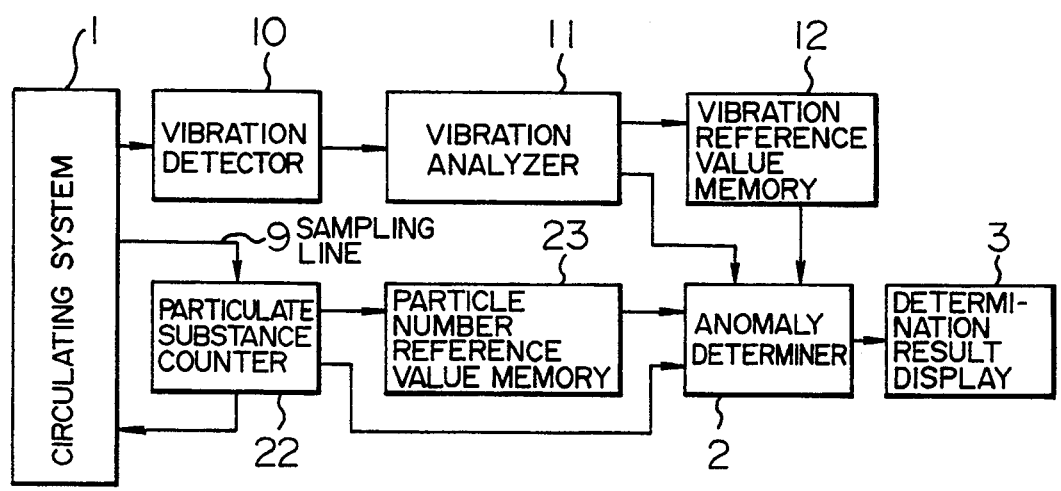
FIG. 9 is a device arrangement diagram of an embodiment of anomaly diagnosis combining the particle counting method and vibration detection.

A further embodiment is shown in FIG. 9. In this embodiment, the vibration detector 10 mounted on the circulating system 1 detects a vibration of the devices included in it. The detected vibration is analyzed by the vibration analyzer 11 in terms of vibration level, frequency pattern, etc. Output of the vibration analyzer 11 is stored in the vibration reference value memory 12, and also input to the anomaly determiner. The liquid circulating through the sampling line 9 from the circulating system 1 is led to the particulate substance counter 22. The particulate substance counter 22 counts particulate substances in the liquid, and the counting results are stored in the particle number reference value memory 23 and also input to the anomaly determiner 2. The anomaly determiner 2 is constantly detecting any change from the measured levels in steady state by comparing input measured values with reference values, and determines anomaly when both variations exceed threshold levels. In this determining process, if one variation is very large, the other variation may be multiplied by a coefficient of weight to lower the threshold level relative to the thus increased variation, under which condition a decision is made whether anomaly has occurred. Output of the anomaly determiner 2 is supplied to the determination result display 3. According to this embodiment, it is possible to diagnose with high reliability and rapidity anomaly of the equipment from an increase in the number of particles that come off and fall owing to the vibration of the devices.

Figure 10:
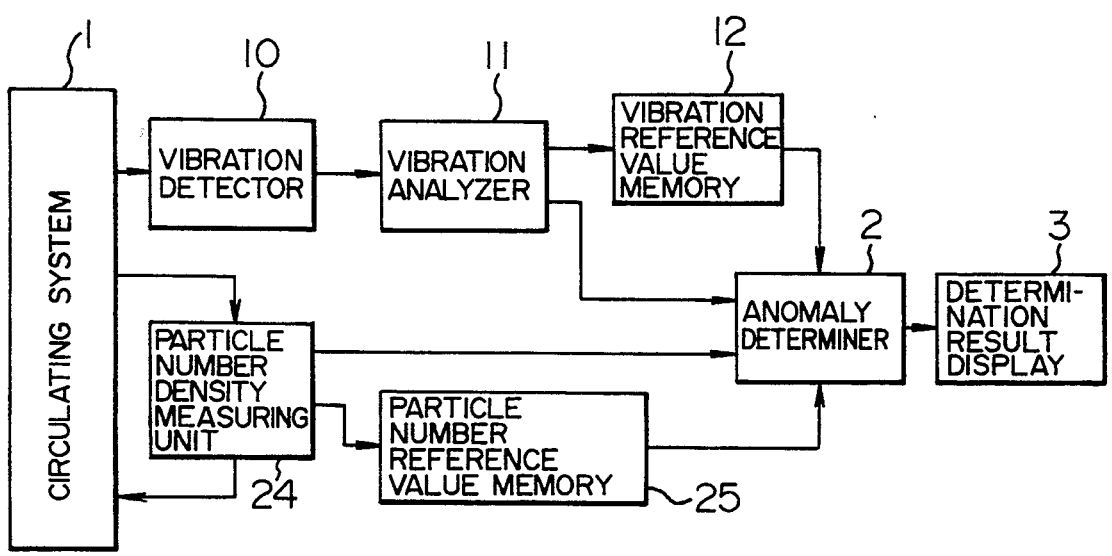
FIG. 10 is a device arrangement diagram of an embodiment of anomaly diagnosis combining the particle number density measuring method and vibration detection.

A still further embodiment is shown in FIG. 10. The basic arrangement of this embodiment is the same as shown in FIG. 9. However, in place of the particulate substance counting method, this embodiment is arranged to adopt a method of measuring a number density of particulate substances shown in FIG. 6. According to this embodiment, it is possible to diagnose with high reliability and rapidity anomaly of the equipment from an increase in the number density of particles that come off and fall caused by the vibration of the devices.

Figure 11:
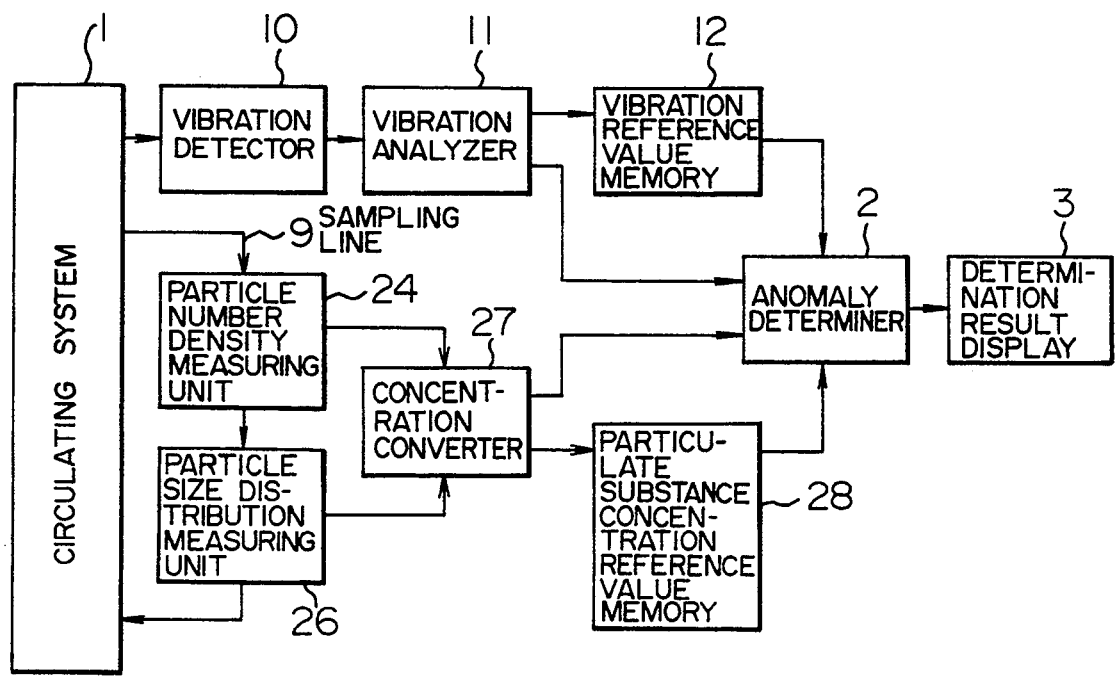
FIG. 11 is a device arrangement diagram of an embodiment of anomaly diagnosis combining the particle concentration measuring method and vibration detection.

Another embodiment is shown in FIG. 11. The basic arrangement of this embodiment is the same as shown in FIG. 9. However, this embodiment is arranged to use a method of measuring the concentration of particulate substances as shown in FIG. 7 in place of the particulate substance counting method. According to this embodiment, it is possible to diagnose with high reliability and rapidity anomaly of the equipment from an increase in the concentration of particles that come off and fall caused by the vibration of the devices.

Figure 12:
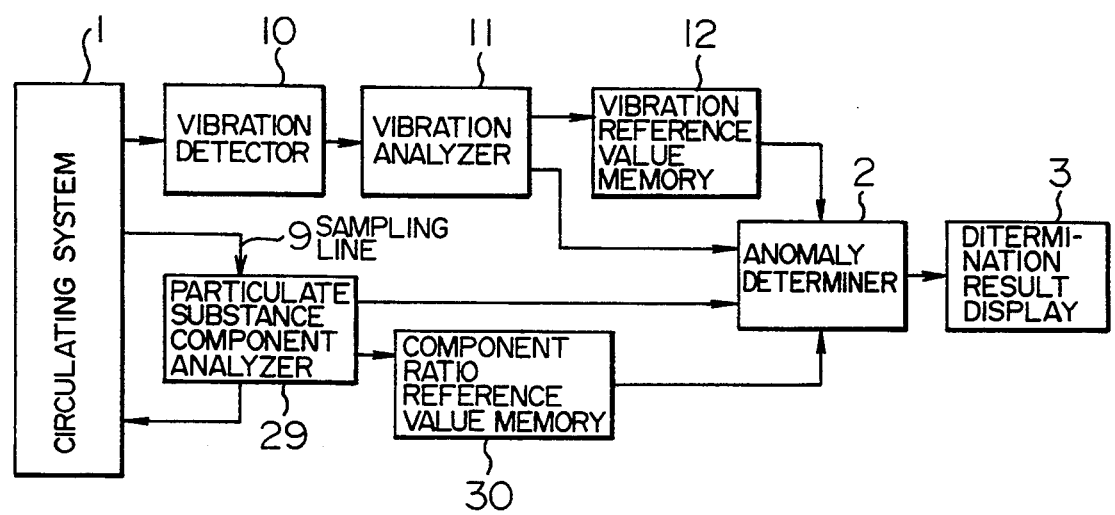
FIG. 12 is a device arrangement diagram of an embodiment of anomaly diagnosis combining the particle component analysis method and vibration detection.

A still further embodiment is shown in FIG. 12. The basic arrangement of this embodiment is the same as shown in FIG. 9, but this embodiment is arranged to adopt a method of analyzing the components of the particulate substances shown in FIG. 8 in place of the particulate substance counting method. According to this embodiment, it is possible to diagnose with high reliability and rapidity anomaly of the equipment from a change in the component ratio of particles that come off and fall as the vibration of the devices increases.

Figure 13:
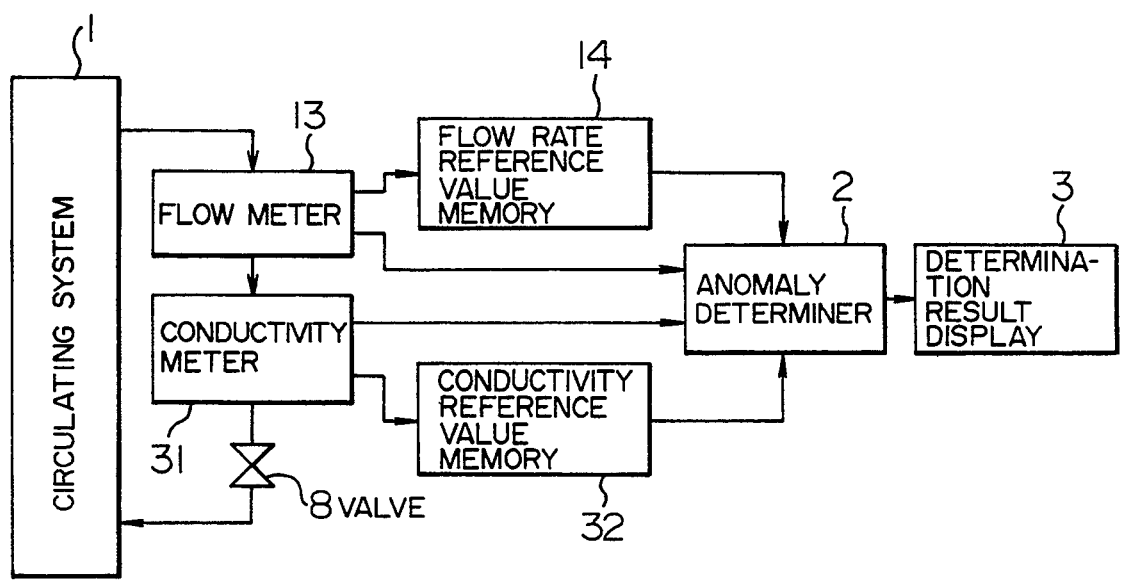
FIG. 13 is a device arrangement diagram of an embodiment of anomaly diagnosis combining a conductivity measuring method and a flow rate measuring method.

Yet another embodiment is shown in FIG. 13. In this embodiment, the flow rate of the circulating liquid is measured with a flow meter 13. The measurement results of the flow meter 13 are stored in a flow rate reference value memory 14 and also input into the anomaly determiner.

On the other hand, a part of the structural material of the piping is ionized and dissolves out from the pipe walls or the like into the circulating liquid. The degree of elution can be detected in terms of ion concentration in the circulating liquid, namely, conductivity of the liquid. When the temperature and the quality of the liquid other than conductivity constant, the elution speed of the ions is constant. Therefore, the conductivity changes dependent upon the quantity, that is, the flow rate of the circulating water that passes per unit time, and as the flow rate decreases, the conductivity increases. The conductivity of the circulating liquid is measured with a conductivity meter 31, and the measurement results are stored in a conductivity reference value memory 32, and also input into the anomaly determiner 2. The anomaly determiner 2 is constantly detecting any change from the measured levels in steady state by comparing input measured values with reference values, and determines anomaly when both variations exceed threshold levels. If one variation is very large, the other variation may be multiplied by a coefficient of weight to lower the threshold level relative to the thus increased variation, under which condition a decision is made whether anomaly has occurred. Output of the anomaly determiner 2 is supplied to the determination result display 3. According to this embodiment, it is possible to measure in-line a decrease in conductivity attending on an increase in the flow rate in the devices or an increase of conductivity attending on a decrease in the flow rate, so that the state of a valve 8 can be presumed and anomaly of the valve 8 can be diagnosed with high reliability and rapidity.

Figure 14:
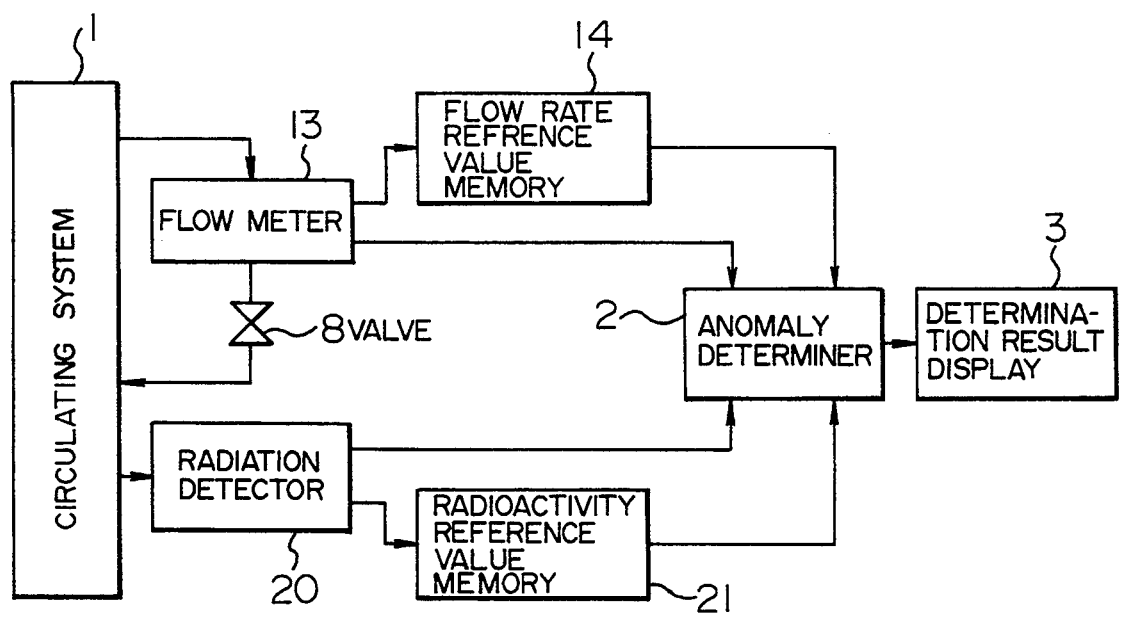
FIG. 14 is a device arrangement diagram of an embodiment of anomaly diagnosis combining the radiation measuring method and the flow rate measuring method.

An additional embodiment is shown in FIG. 14. In this embodiment, a flow rate of the circulating liquid is measured with a flow meter 13. The measurement results of the flow meter 13 are stored in the flow rate reference value memory 14 and also input into the anomaly determiner. On the other hand, when the flow rate changes, the amount of $^{16}N$ that moves to the gaseous state also changes, so that the radioactivity level of the medium changes. So, the radiation dose contained in the medium of the circulating system 1 is detected with the radiation detector 20. The radioactivity level detected with the radiation detected by the radiation detector 20 is stored in the radioactivity reference value memory 21, and input into the anomaly determiner 2. The anomaly determiner 2 is constantly detecting any change from the measured levels in steady state by comparing input measured values with reference values, and determines anomaly when both variations exceed threshold levels. If one variation is very large, the other variation may be multiplied by a coefficient of weight to lower the threshold level relative to the increased variation, under which condition a decision is made whether anomaly has occurred. Output of the anomaly determiner 2 is supplied to the determination result display 3. According to this embodiment, it is possible to measure in-line an increase in radioactivity level attending on an increase in the flow rate in the devices or a decrease in radioactivity level attending on a decrease in the flow rate, so that the state of the valve 8 can be presumed and anomaly of the valve 8 can be diagnosed with high reliability and rapidity.

Figure 15:
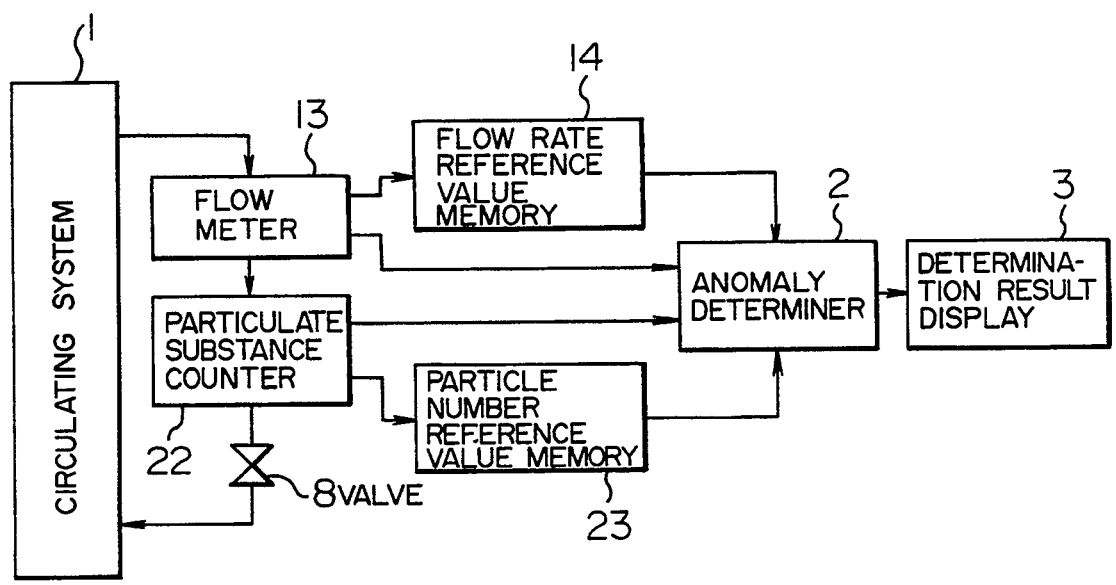
FIG. 15 is a device arrangement diagram of an embodiment of anomaly diagnosis combining the particle number counting method and the flow rate measuring method.

Another embodiment is shown in FIG. 15. The basic arrangement of this embodiment is the same as shown in FIG. 13. However, as the flow rate changes, the number of particles that move per unit time also changes, so that the anomaly diagnosis apparatus is arranged so that both the flow rate and the number of particles are measured. According to this embodiment, it is possible to measure in-line an increase in the number of particles attending on an increase in the flow rate of the equipment or a decrease in the number of particles attending on a decrease in the flow rate, and therefore, the state of the valve 8 can be presumed and anomaly of the valve 8 can be diagnosed with high reliability and rapidity.

Figure 16:
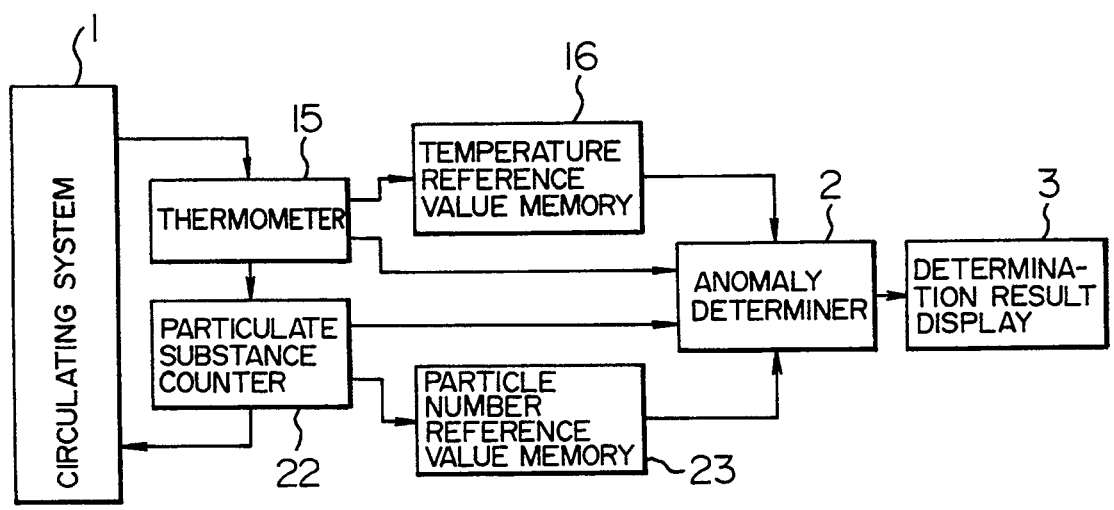
FIG. 16 is a device arrangement diagram of an embodiment of anomaly diagnosis combining the particle number counting method and the flow rate measuring method.

Next, still another embodiment is shown in FIG. 16. In this embodiment, a temperature of the liquid circulating from the circulating system 1 is measured with a thermometer 15. The measured temperature value is stored in a temperature reference value memory 16 and input into the anomaly determiner 2. On the other hand, the breaking-away behavior of the particulate substances has temperature dependency, and they are more likely to break away at higher temperature, so that the number of particles varies with changes of temperature in the circulating system. Therefore, the number of particles in the circulating liquid which is led to the particulate substance counter 22 is counted with the particulate substance counter 22, and the counting results are stored in the particle number reference value memory 23, and also input into the anomaly determiner 2. The anomaly determiner 2 is constantly detecting any change from the measured levels in steady state, and determines anomaly when both variations exceed threshold levels. If at this time one variation is very large, the other variation may be multiplied by a coefficient of weight to lower the threshold level relative to the increased variation, under which condition a decision is made whether anomaly has occurred. Output of the anomaly determiner is supplied to the determination result display 3. In this embodiment, a method is adopted for measuring broken-away particulate substances that increase as the temperature of the circulating liquid rises, so that measurement can be performed in-line and anomaly of the circulating system 1 can be diagnosed with rapidity.

Figure 17:
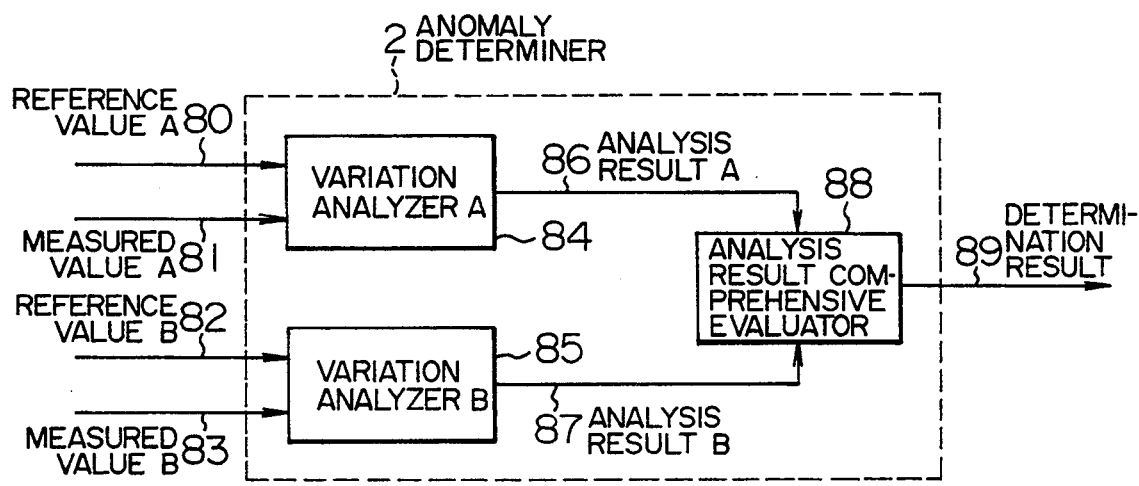
FIG. 17 is a detailed device arrangement diagram of the anomaly determiner.

Yet another embodiment is shown in FIG. 17. This embodiment indicates a detailed arrangement of the anomaly determiner which has been referred to in the foregoing description. With regard to quantity A under observation for detecting variation, a reference value A 80 and a measured value A 81 are input into a variation analyzer A 84. On the other hand, with regard to quantity B under observation, a reference value B 82 and a measured value B 83 are input into a variation analyzer B 85. The variation analyzer A 84 evaluates only the variation of the quantity A, and compares the variation with a threshold value set initially. As a result of comparison, the variation analyzer A 84 outputs analysis result A 86 such as information about whether the variation exceeds the threshold value, the degree of variation or the like. A similar process is performed also for the quantity B. The analysis result A 86 and analysis result B 87 are input into an analysis result comprehensive evaluation unit 88. The analysis result comprehensive evaluation unit 88 evaluates the analysis result A 86 and the analysis result B 87, and outputs "anomaly" when variations of both quantities under observation exceed the threshold values. On the other hand, even when the variation exceeds the threshold value in information about, for example, the analysis result A 86, if the variation does not exceed the threshold value in the analysis result B, the analysis result comprehensive evaluation unit 88 outputs "nonanomaly", and at the same time, outputs anomaly of the measuring system itself with regard to the quantity A under observation, and suggests a need for inspection of the measuring instrument to the operator. However, it is possible to make an arrangement that when the variation exceeds twice the threshold value, for example, in the analysis result A 86, the threshold value used for comparison and decision in the analysis result B 87 is lowered, a comparison is made between the reference value B 82 and the measured value B 83, and if the variation of the quantity B is larger than the newly-set threshold value, the analysis result comprehensive evaluation unit 88 outputs "anomaly". By the arrangement of this embodiment, a plurality of quantities under observation are observed, not only diagnosis can be performed with high reliability, but even when anomaly occurs in one of the quantities under observation, a decision can be made whether the variation is a true "anomaly" or the measuring instrument is abnormal.

Figure 18:
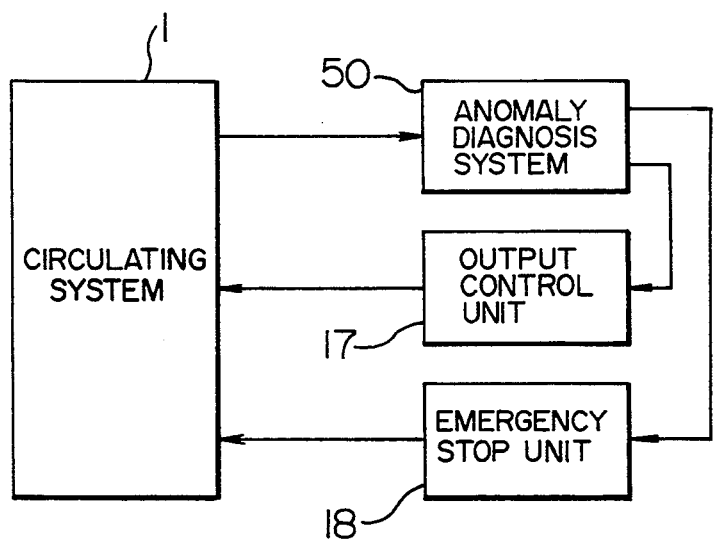
FIG. 18 is a device arrangement diagram of an embodiment of anomaly diagnosis combining the anomaly diagnosis apparatus and equipment operation control.

A still another embodiment is shown in FIG. 18. In this embodiment, the anomaly diagnosis system 50 shown in FIG. 1 and FIGS. 4 to 17 is arranged to be provided additionally with an output control unit 17 and an emergency stop unit 18. When the anomaly diagnosis system 50 outputs "anomaly", output-controlled operation of the plant can be performed in compliance with the "anomaly" level or the plant operation can be stopped in an emergency stop. By the arrangement of this embodiment, there is no process where the operator has to make a decision as to anomaly, so that the time for responding to plant anomaly can be shortened substantially and the anomaly can be prevented from spreading.

According to the present invention, anomaly of facilities such as a nuclear power plant can be diagnosed with high reliability, a fact which makes it possible to greatly improve the safety control technology of the facilities which require monitoring, such as nuclear power plants, chemical plant, and so on.

What is claimed is:

1. A plant diagnosis apparatus comprising:
   first detecting means for detecting a state of devices constituting a circulating system in which a fluid circulates;
   second detecting means for detecting a quality of said circulating fluid caused by and indicative of impurities in said circulating fluid; and
   means for diagnosing said circulating system from a correlation between outputs of said first and second detecting means.

2. A plant diagnosis apparatus comprising:
   first detecting means for detecting a state of device constituting a circulating system in which water circulates;
   second detecting means for detecting a quality of said circulating water caused by and indicative of impurities in said circulating water; and
   means for diagnosing said circulating system by a correlation between outputs of said first and second detecting means.

3. A plant diagnosis apparatus comprising:
   first detecting means for detecting a state of devices constituting a circulating system in which a fluid circulates;
   second detecting means for detecting a quality of atmosphere around said circulating system; and
   means for diagnosing said circulating system from a correlation between outputs of said first and second detecting means.

4. A plant diagnosis apparatus comprising:
   first detecting means for detecting a vibrating condition of devices constituting a circulating system in which a fluid circulates;
   second detecting means for detecting a quality of said circulating fluid caused by and indicative of impurities in said circulating fluid; and
   means for diagnosing said circulating system by a correlation between outputs of said first and second detecting means.

5. A plant diagnosis apparatus comprising:
   first detecting means for detecting a vibrating condition of devices constituting a circulating system in which water circulates;
   second detecting means for detecting a quality of said circulating water caused by and indicative of impurities in said circulating water; and
   means for diagnosing said circulating system by a correlation between outputs of said first and second detecting means.

6. A plant diagnosis apparatus comprising:
   first detecting means for detecting a vibrating condition of a pump constituting a circulating system;
   second detecting means for detecting a quality of said circulating fluid caused by and indicative of impurities in said circulating fluid; and
   means for diagnosing said circulating system by a correlation between outputs of said first and second detecting means.

7. A plant diagnosis apparatus comprising:
   first detecting means for detecting a state of devices constituting a circulating system in which a fluid circulates;
   second detecting means for detecting a quality of said circulating fluid caused by and indicative of impurities in said circulating fluid; and
   means for diagnosing said circulating system as normal when one of outputs of said first and second detecting means indicates anomaly and the other output indicates normalcy.

8. A plant diagnosis apparatus comprising:
   first detecting means for detecting a state of devices constituting a circulating system in which a fluid circulates;
   second detecting means for detecting a quality of said circulating fluid caused by and indicative of impurities in said circulating fluid; and
   means for diagnosing said circulating system as normal when an output of said first detecting means indicates anomaly and an output of said second detecting means indicates normalcy.

9. A plant diagnosis apparatus comprising:
   first detecting means for detecting a flow rate of a fluid circulating in a circulating system as a state of devices constituting said circulating system;
   second detecting means for detecting a quality of said circulating fluid caused by and indicative of impurities in said circulating fluid; and
   means for diagnosing said circulating system by a correlation between outputs of said first and second detecting means.

10. A plant diagnosis apparatus comprising:
    first detecting means for detecting a temperature of a fluid circulating in a circulating system;

second detecting means for detecting a quality of said circulating fluid caused by and indicative of impurities in said circulating fluid and means for diagnosing said circulating system by a correlation between outputs of said first and second detecting means.

11. A plant diagnosis apparatus comprising:

analysis means for analyzing components of particulate substances in a fluid flowing in a circulating system; and means for diagnosing said circulating system according to a result from said analysis means.

12. A plant diagnosis apparatus comprising:

first detecting means for detecting a state of devices constituting a circulation system of the plant in which a fluid circulates;

second detecting means for analyzing particulate substances in the fluid flowing in said circulating system; and means for diagnosing said circulating system by correlation between outputs of said first and second detecting means.

13. A plant diagnosis apparatus comprising:

first detecting means for detecting vibration of devices constituting a circulating system in which a fluid circulates;

second detecting means for analyzing particulate substances in the fluid flowing in said circulating system; and means for diagnosing said circulating system by a correlation between outputs of said first and second detecting means.

14. A plant diagnosis apparatus comprising:

first detecting means for detecting a state of devices constituting a circulating system in which a fluid circulates;

second detecting means for detecting at least either a conductivity or pH value of the fluid flowing in said circulating system; and means of diagnosing said circulating system by a correlation between outputs of said first and second detecting means.

15. A plant diagnosis apparatus comprising:

first detecting means for detecting at least either a temperature or a flow rate of a fluid circulating in a circulating system as a state of devices constituting said circulating system;

second detecting means for detecting a quality of atmosphere around said circulating system; and means for diagnosing said circulating system by a correlation between outputs of said first and second detecting means.

16. A plant diagnosis method comprising the step of:

diagnosing a circulating system from a correlation between information about devices constituting said circulating system in which a fluid circulates and information about quality of said circulating fluid caused by and indicative of impurities in said circulating fluid.

17. A plant diagnosis method comprising the steps of:

detecting an indication of anomaly of devices constituting a circulating system in which a fluid circulates; and subsequently determining the presence or absence of anomaly of said devices according to a detection result as to quality of said circulating fluid caused by and indicative of impurities in said circulating fluid.

18. A plant diagnosis method comprising the steps of:

detecting signals of anomaly of a whole circulating system by detecting a quality of a fluid circulating in said circulating system, said quality being caused by and indicative of impurities in said circulating fluid; and subsequently determining the presence or absence of anomaly of devices from a detection result indicating a state of devices constituting said circulating system.

19. A plant diagnosis method comprising the step of:

diagnosing devices constituting a circulating system by analyzing components of particulate substances in a fluid circulating in said circulating system.

20. A plant diagnosis method comprising the step of:

diagnosing a circulating system by a correlation between information about devices constituting said circulating system in which a fluid circulates and information about quality of an atmosphere around said circulating system, 21. A plant diagnosis method comprising the step of:

diagnosing a circulating system as normal when either one of information about devices constituting said circulating system in which a fluid circulates and information about quality of said circulating fluid caused by and indicative of impurities in said circulating fluid indicates anomaly and the other information indicates normalcy.

22. A plant diagnosis method comprising the step of:

diagnosing a circulating system, as normal when information about devices constituting said circulating system in which a fluid circulates caused by and indicative of impurities in said circulation fluid indicates anomaly and information about quality of said circulating fluid indicates normalcy.

23. A plant comprising:

a circulating system in which a fluid circulates;

first detecting means for detecting a state of devices constituting said circulating system;

second detecting means for detecting a quality of said circulating fluid caused by and indicative of impurities in said circulating fluid; and means for diagnosing said circulating system by a correlation between outputs of said first and second detecting means.

24. A plant comprising:

a circulating system in which water circulates;

first detecting means for detecting a state of devices constituting said circulating system;

second detecting means for detecting a quality of said circulating water caused by and indicative of impurities in said circulating water; and means for diagnosing said circulating system by a correlation between outputs of said first and second detecting means.

25. A plant comprising:

a circulating system in which a fluid circulates;

first detecting means for detecting a state of devices constituting said circulating system;

second detecting means for detecting a quality of atmosphere around said plant; and means for diagnosing said circulating system by a correlation between outputs of said first and second detecting means.

26. A plant comprising:

a circulating system in which water circulates;

first detecting means for detecting a vibrating state of devices constituting said circulating system;

second detecting means for detecting a quality of said circulating water caused by and indicative of impurities in said circulating water; and means for diagnosing said circulating system by a correlation between outputs of said first and second detecting means.

27. A plant comprising:

a circulating system in which water circulates;

analysis means for analyzing components of particulate substances in a fluid flowing in said circulating system; and means for diagnosing said circulating system according to a result from said analysis means.

28. A nuclear power plant having a recirculation system comprising:

first detecting means for detecting a vibration of said recirculation system;

second detecting means for detecting quality of cooling water of said recirculation system, said quality being caused by and indicative of impurities in said cooling water; and means for diagnosing devices constituting said recirculation system by output of said first and second detecting means.

29. A nuclear power plant having a recirculation system comprising:

first detecting means for detecting a vibration of said recirculation system;

second detecting means for detecting a quality of atmosphere around said nuclear power plant; and means for diagnosing devices constituting said recirculation system by output of said first and second detecting means.

30. A nuclear power plant having a recirculation system comprising:

first detecting means for detecting a vibration of a pump of said recirculation system;

second detecting means for detecting a quality of cooling water of said recirculation system, said quality being caused by and indicative of impurities in said cooling water;

means for diagnosing said pump of said recirculation system by output of said first and second detecting means.

31. A plant comprising:

a circulating system having a reactor core, a main vapor line, a turbine, a condenser and a feed water line;

first detecting means for detecting a state of device constituting said circulating system;

second detecting means for detecting a quality of cooling water of said recirculating system, said quality being caused by and indicative of impurities in said cooling water; and means for diagnosing devices constituting said circulating system by output of said first and second detecting means.

32. A plant comprising:

a circulating system having a reactor core, a main vapor line, a turbine, a condenser, a feed water line, and a recirculation system;

first detecting means for detecting a state of devices constituting said circulating system;

second detecting means for detecting a quality of cooling water of said circulating system, said quality being caused by and indicative of impurities in said cooling water; and means for diagnosing devices constituting said circulating system by output of said first and second detecting means.

33. A plant according to claim 25, wherein the plant is a nuclear plant and the circulating system is a recirculating system in which cooling water is the water which circulates.

34. A plant according to claim 25, wherein the plant is a nuclear power plant and the circulating system is a recirculation system of the nuclear power plant, the first detecting means detecting a vibration state of the devices of the recirculation system.

35. A plant according to claim 26, wherein the plant is a nuclear power plant and the circulating system is a recirculation system of the nuclear power plant, the first detecting means detecting a vibration of a pump of said recirculation system as a vibrating state of devices constituting said circulating system, the means for diagnosing diagnosing said pump of said recirculation system.

36. A plant according to claim 26, wherein the circulating system includes a reactor core, a main vapor line, a turbine, a condenser and a feed water line.

37. A plant according to claim 26, wherein the circulating system includes a reactor core, a main vapor line, a turbine, a condenser, a feed water line and a recirculation system.

38. A plant diagnosis apparatus according to any one of claims 1, 2 and 4–10 wherein the second detecting means for detecting a quality of said circulating fluid caused by and indicative of impurities in said circulating fluid includes means for detecting at least one of a value relating to a number of particles in the fluid, conductivity and pH value of the fluid as a quality thereof.

39. A plant diagnosis apparatus according to any one claims 3 and 15 wherein said second detecting means for detecting a quality of atmosphere around said circulating system includes radiation detection means for detecting radiation as the quality of the atmosphere.

40. A plant diagnosis method according to any one of claims 16, 17, 21 and 22 wherein information about quality of said circulating fluid carried by impurities in said circulating fluid includes information of at least one of a value relating to a number of particles in said circulation fluid, conductivity and pH of said circulating fluid.

41. A plant diagnosis method according to claim 20, wherein said information about quality of an atmosphere around said circulating system includes information about radiation of the atmosphere.

42. A plant according to any one of claims 23, 14 and 26, wherein said second detecting means for detecting a quality of said circulating water caused by and indicative of impurities in said circulating water includes means for detecting at least one of a value relating to a number of particles in said circulating water, conductivity and pH of said circulating water as the quality thereof.

43. A plant according to claim 25, wherein said second detecting means for detecting a quality of atmosphere around said plant includes means for detecting radiation as the quality of atmosphere.

44. A nuclear power plant having a recirculation system comprising:

first detecting means for detecting a vibration of a pump of said recirculation system;

second detecting means for detecting a quality of cooling water of said recirculation system at an outlet side of said pump, said quality being caused by and indicative of impurities included in said cooling water;

means for diagnosing said pump of said recirculation system by output of said first and second detecting means.

* * * * *